(12) United States Patent
Dross et al.

(10) Patent No.: US 10,677,398 B2
(45) Date of Patent: Jun. 9, 2020

(54) SOLID STATE LIGHT EMITTER LIGHTING ASSEMBLY AND A LUMINAIRE

(71) Applicant: SIGNIFY HOLDING B.V., Eindhoven (NL)

(72) Inventors: Oliver Dross, Waalre (NL); Michel Cornelis Josephus Vissenberg, Roermond (NL); Johannes Petrus Maria Ansems, Hulsel (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/476,313

(22) PCT Filed: Dec. 29, 2017

(86) PCT No.: PCT/EP2017/084803
§ 371 (c)(1),
(2) Date: Jul. 8, 2019

(87) PCT Pub. No.: WO2018/127457
PCT Pub. Date: Jul. 12, 2018

(65) Prior Publication Data
US 2019/0346090 A1   Nov. 14, 2019

(30) Foreign Application Priority Data
Jan. 9, 2017 (EP) .................................... 17150602

(51) Int. Cl.
*F21K 9/61* (2016.01)
*F21K 9/66* (2016.01)
(Continued)

(52) U.S. Cl.
CPC ................. *F21K 9/61* (2016.08); *F21K 9/66* (2016.08); *F21K 9/68* (2016.08); *F21V 7/0008* (2013.01);
(Continued)

(58) Field of Classification Search
CPC ..... F21K 9/61; F21K 9/66; F21V 7/04; F21V 7/0008
See application file for complete search history.

(56) References Cited

U.S. PATENT DOCUMENTS 7,762,701 B2    7/2010  Luo et al.
2012/0140481 A1*  6/2012  Simchak .................. F21V 7/07
                                              362/296.07
(Continued)

FOREIGN PATENT DOCUMENTS

CN     204083872 U    1/2015
CN     104977650 A    10/2015
(Continued)

*Primary Examiner* — Joseph L Williams
*Assistant Examiner* — Jacob R Stern
(74) *Attorney, Agent, or Firm* — Daniel J. Piotrowski (57) ABSTRACT

A solid state light emitter lighting assembly (100) and a luminaire are provided. The solid state light emitter assembly comprises a light exit window (110), a reflector (120', 120"), a light guide (150', 150") and a solid state light emitter (160). The reflector reflect light towards the light exit window and has at least one edge (122', 122") bending towards the light exit window. The light guide receives light at a first end (152) and emits at a second end (154', 15") the guided light towards the reflector. The first end is arranged at a first side of the at least one edge. The first side is away from a reflecting surface (124) of the reflector. The solid state light emitter is also at the first side and emits light towards the first end of the light guide. A portion of the light that is reflected by the reflector is transmitted through the light guide through side surfaces of the light guide.

15 Claims, 8 Drawing Sheets

(51) Int. Cl.
  *F21K 9/68*    (2016.01)
  *F21V 7/04*    (2006.01)
  *F21V 8/00*    (2006.01)
  *F21V 7/00*    (2006.01)
  *F21Y 115/10*  (2016.01)

(52) U.S. Cl.
  CPC .............. *F21V 7/04* (2013.01); *G02B 6/0008* (2013.01); *F21Y 2115/10* (2016.08)

(56) References Cited

U.S. PATENT DOCUMENTS

| | | |
|---|---|---|
| 2013/0155719 A1 | 6/2013 | Brott et al. |
| 2014/0340927 A1 | 11/2014 | Johnston et al. |
| 2015/0211710 A1* | 7/2015 | Speier .................... F21S 8/04 362/606 |

FOREIGN PATENT DOCUMENTS

| | | |
|---|---|---|
| DE | 10115868 A1 | 10/2002 |
| FR | 2858682 A1 | 2/2005 |
| JP | 2002050210 A | 2/2002 |
| JP | 2011198659 A | 10/2011 |
| JP | 2015060645 A | 3/2015 |
| JP | 2015069841 A | 4/2015 |
| WO | 2014080771 A1 | 5/2014 |

\* cited by examiner

SOLID STATE LIGHT EMITTER LIGHTING ASSEMBLY AND A LUMINAIRE

CROSS-REFERENCE TO PRIOR APPLICATIONS

This application is the U.S. National Phase application under 35 U.S.C. § 371 of International Application No. PCT/EP2017/084803 filed on Dec. 29, 2017, which claims the benefit of European Patent Application No. 17150602.5 filed on Jan. 9, 2017. These applications are hereby incorporated by reference herein.

FIELD OF THE INVENTION

The invention relates to a solid state light emitter lighting assembly. The invention further relates to a luminaire.

BACKGROUND OF THE INVENTION

In the last few years, particularly in the professional lighting channel, most conventional spot lamps have been replaced by Light Emitting Diode (LED) retrofit spot lamps because of the energy saving and short payback time. The difference in characteristics of the traditional incandescent light emitters and the LEDs require a different design of the optics, the heat management solutions and the electrical circuitry. Although different aspects must be designed differently, it is also required that a LED retrofit spot lamp can directly replace the traditional lamp without any modification to the luminaire. As such it is advantageous if a LED retrofit spot lamp has exactly the same shape and size as the traditional lamp.

For instance, JP 2011 198659 A discloses an LED lamp equipped with a light guide lens to guide the light from an LED light source, an incident face, an inside reflecting face, an outside reflecting face, and an emitting face are installed at the light guide lens. The inside reflecting face is formed by rotating a quarter arc around the center axial line arranged so that a tangent line to pass through the end point becomes parallel with the center axial line, so that the tangent line to pass through the end point becomes perpendicular to the center axial line, and so that the end point is positioned closer to the center axial line than the end point. The outside reflecting face is formed by rotating a quarter arc around the center axial line arranged so that the tangent line to pass through the end point becomes parallel with the center axial line, so that the tangent line to pass through the end point becomes perpendicular to the center axial line, and so that the end point is positioned closer to the center axial line than the end point.

For instance, US 2014/340927 discloses a lightguide which functions as a luminaire. The luminaire includes at least one solid state light source, such as an LED, and a lightguide configured to receive light from the solid state light source. Light from the light source is coupled into the lightguide and transported within it by total internal reflection until the light exits the lightguide. A shape of the lightguide causes and directs extraction of the light, and can also be used to create a particular pattern of the extracted light. Such shapes include linear wedges and twisted wedges. Optical films can be included on the light input and output surfaces of the lightguide.

For instance, WO 2014/080771 A1 discloses an illumination device which guides and projects projected light of LED elements via light guiding bodies which are configured from upper part light guiding bodies, middle part light guiding bodies, and lower part light guiding bodies. The upper part light guiding bodies are hollow cylinders, and the LED elements which project illumination light toward the partition wall inner parts of the upper part light guiding bodies are positioned on the upper end faces thereof. The middle light guiding bodies have flaring hollow shapes which are bent such that the illumination light which is projected and proceeds nearly linearly from the LED elements along the partition wall inner parts of the upper part light guiding bodies is blocked, and to widen in the outer circumference direction of the upper part light guiding bodies. The lower part light guiding bodies have hollow flange shapes extending in a nearly horizontal direction so as to be orthogonal to the upper part light guiding bodies.

For instance, US 2013/155719 A1 discloses a lightguide functioning as a luminaire. The luminaire includes at least one solid state light source, such as an LED, and a lightguide configured to receive light from the solid state light source. Light from the light source is coupled into the lightguide and transported within it by total internal reflection until the light exits the lightguide. A shape of the lightguide causes and directs extraction of the light. The shape can also be used to create a particular pattern of the extracted light.

An example of a spotlight based on Light Emitting Diodes is, for example, disclosed in CN204083872U. At a center of a reflector is provided a Light Emitting Diode and a light guide provided on top of the Light Emitting Diode. The emitted light is coupled into the light guide and because of the specific shape of the light guide a significant part of the light is emitted towards the reflector via side surfaces of the light guide. The reflector reflects the impinging light towards a light exit window or a light exit diaphragm of the spotlight such that a light beam is emitted into the surroundings of the spotlight. In such a solution the light guide is used to, and designed to, simulate the light emission pattern of a traditional incandescent light emitter. A similar solution is provided in JP5437128B2.

The solution of the above cited documents is difficult to integrate in, for example, an AR111 spot lamps. The specific design of the light guide of these document make the spotlight of the above cited documents relatively thick. Furthermore, it is about impossible to use the solution of the above cited document in an AR111 spot lamp if the AR111 spot lamp has to emit a relatively narrow light beam, e.g. with a Full Width Half Maximum (FWHM) beam angle of 7 degrees.

SUMMARY OF THE INVENTION

It is an object of the invention to provide a solid state light emitter lighting assembly that is compact and that enables use of the solid state light emitter lighting assembly in a retrofit lamp.

For this purpose, according to an aspect of the invention, a solid state light emitter lighting assembly is provided. For this purpose, according to another aspect of the invention, a luminaire is provided.

The solid state light emitter lighting assembly is for emitting a beam of light. The solid state light emitter lighting assembly comprises a light exit window, a reflector, a light guide, and a solid state light emitter. The light beam is transmitted, in use, through the light exit window into a surrounding of the solid state light emitter lighting assembly. The reflector reflects, in use, impinging light towards the light exit window. The reflector has a curved reflective surface and has at least one edge bending towards the light exit window. The light guide has a first end that, in use, couples light into the light guide. The light guide has a second end that, in use, couples light out of the light guide. The light guide has side surfaces in between the first end and the second end. The light guide guides, in use, the incoupled light from the first end towards the second end by total internal reflection. The first end being arranged at a first side of the at least one edge of the reflector. The first side is a side that is away from the reflecting surface in other words, at one side of the at least one edge is the reflecting surface and at another side of the at least one edge is the first side. The second end is arranged at a position in between the reflector and the light exit window and emits, in use, the outcoupled light in directions away from the light exit window towards the reflector. Directions away from the light exit window towards the reflector are directions that are not directly directed towards the light exit window but are directed from the second end towards the reflector. The solid state light emitter is arranged outside the reflector. The solid state light emitter is arranged at a position at the first side. In other words, seen in a top view along a direction from the light exit window towards the reflector, the solid state light emitter is at a side of the at least one bending edge that is away from the reflective surface. The solid state light emitter emits, in use, light towards the first end of the light guide. In use, a portion of the light that is reflected by the reflector towards light exit window is transmitted through the light guide via the side surfaces.

The measures have the effect that the solid state light emitter lighting assembly can be made relatively compact, for example, relatively thin such that it well fits within a traditional AR111 spot lamp. This means in this context that a distance from the light exit window up to the back side of the solid state light emitter lighting assembly is relatively small. The fact that the solid state light emitter is not above the reflector contributes to a relatively thin solid state light emitter lighting assembly. Furthermore, the area of the reflector can be relatively large because it is not necessary to interrupt the reflector by an area for the solid state light emitter, such as, for example, in the embodiments of the cited Chinese patent application. A relatively large reflector means that a maximum peak light output can be relatively large and that the solid state light emitter lighting assembly is less experienced as a point light source (and, thus, the risk of the experience of glare is reduced). The solid state light emitter is provided outside the reflector and, therefore, it is relatively easy to couple the light source to cooling structures for transporting the heat away from the light source.

In the design of the solid state light emitter, there are quite a lot of degrees of freedom for designing the reflector because the solid state light emitter is provided at another position than the reflector and because the light guide is used to transport the light towards the reflector. Therefore, it is relatively easy to apply a reflector that emits the light in a relatively narrow light beam. Additionally, it also provides the advantage that the reflector design can be further optimized to correct for disadvantageous effects of other elements of the solid state light emitter lighting assembly.

Furthermore, the positioning of the first end of the light guide and the second end of the light guide is such that the light guide does not need to comprise relatively sharp curves. Such relatively sharp curves may lead to light leakage in between the first end and the second end. Light leakage may result in many disadvantages, such as, the experience of glare by users, distortion of the shape of the emitted light beam, and a loss of efficiency/efficacy.

Optionally, the reflector and/or the light guide are rotational symmetrical around an axis. The use of a rotational symmetrical reflector and/or light guide enables the integration of the solid state light emitter lighting assembly in a design/shape of many traditional lamp designs such as, for example, the AR111 design. If the solid state light emitter lighting assembly is used in the traditional lamp design/shape, space must be efficiently used and this can be done by using the rotational symmetrical reflector and/or light guide. Thereby a relatively large light emitting surface can be obtained and this enables the emission of a relatively high peak intensity of light.

Optionally, the reflector has in at least one direction a cross sectional shape that consists of a left curved part and a right curved part. Said curved parts both comprise, seen with respect to a center point of the cross sectional shape, an inner edge that bends into the direction of the light exit window and an outer edge that bends into the direction of the light exit window. The solid state light emitter is provided, seen in a top view along a direction from the light exit window towards the reflector, in between the inner edges of the left curved part and the right curved part. Optionally, the first end is arranged, seen in a top view along a direction from the light exit window towards the reflector, in the region in between the inner edges. The second end is arranged, seen in a top view along a direction from the light exit window towards the reflector, in between the inner edge and the outer edge of one of the left part and the right part. Or, the light guide comprises two sections both having a second end. One of the two second ends is arranged, seen in a top view along a direction from the light exit window towards the reflector, in between the inner edge and the outer edge of the left curved part. Another one of the two second ends is arranged, seen in a top view along a direction from the light exit window towards the reflector, in between the inner edge and the outer edge of the right curved part. Optionally, a plurality of solid state light emitters are provided, seen in a top view along a direction from the light exit window towards the reflector, in between the inner edges of the left curved part and the right curved part.

In the optional embodiments of the above paragraph, the solid state light emitter, and optionally, a plurality of solid state light emitters, are arranged close to the center of the solid state light emitter lighting assembly and are arranged relatively close to each other. This may result in the advantage that a relatively small printed circuit board area has to be used to provide power to the solid state light emitter(s) and this reduces the costs of the solid state light emitter lighting assembly.

The optional embodiments that are discussed above may be a (partly) rotational symmetrical solid state light emitter lighting assembly, and may also be an elongated (e.g. linear) design.

The design of the above discussed solid state light emitter lighting assembly has several degrees of freedom. It is noted that the portion of the light that is transmitted through the light guide is refracted at the side surfaces of the light guide and, therefore, this light may obtain a light transmission direction that is not optimal with respect to the requirements of the light beam that has to be emitted into the surroundings. In an optional solution, a cross-sectional shape of a portion of the reflector that reflects impinging light towards the light guide for transmission through the light guide via the side surfaces, deviates from an ideal circular or parabolic shape to correct for a deteriorated collimation of a portion of the light of the beam of light as the result of refraction of light rays that are transmitted through the light guide via the side surfaces. In an optional solution, at least a segment of the light guide is curved and the portion of the light that is reflected by the reflector towards light exit window is transmitted through the segment via the side surfaces. A cross-sectional thickness of the light guide along the segment varies to compensate for a negative effect of the segment of the light guide on the collimation of the light rays that are transmitted through the segment via the side surfaces.

Also other measures may be used to obtain a transmitted light beam that is optimal with respect to a set of requirements. For example, the second end of the light guide is adapted to influence the light intensity distribution emitted by the second end towards the reflector to optimize the beam of light that is transmitted into the surroundings. For example the second end may be wedge shaped, optionally only wedge shaped in a cross-sectional view, may be flat, may be curved, may comprise facets, may comprise a combination of curved surfaces and facets, or a combination of a flat surface and curved surfaces, and other combination of the mentioned options. For example, the first end, the second end, or portions of the side surfaces of the light guide comprises structures for mixing light that is guided through the light guide to optimize a light intensity distribution that leaves the light guide at the second end. Such structures may be surface roughness, surface texture, recesses, protrusions, particles provided at or in the portions of the side surfaces, and/or any other appropriate light mixing structure.

Optionally, the solid state light emitter lighting assembly comprises a second reflector, the second reflector being arranged at a position to reflect leakage light. Leakage light is light that is emitted by the solid state light emitter and is either not coupled into the first end of the light guide because of surface reflection, light rejection, scattering or because of a light emission direction that is not directly towards the first end of the light guide. The second reflector reflects leakage light towards the first end of the light guide or towards the light exit window. This optional embodiment may reduce the experience of glare, may reduce a distortion of the transmitted light beam with respect to its requirements and may increase the efficiency of the solid state light emitter lighting assembly.

According to another aspect of the invention a luminaire is provided. The luminaire comprises a solid state light emitter lighting assembly according to the above discussed aspect of the invention and/or according to one of the embodiments discussed in this application. The luminaire has similar effects and advantages as the discussed solid state light emitter lighting assemblies.

Further preferred embodiments of the device and method according to the invention are given in the appended claims, disclosure of which is incorporated herein by reference.

BRIEF DESCRIPTION OF THE DRAWINGS

These and other aspects of the invention will be apparent from and elucidated further with reference to the embodiments described by way of examples in the following description and with reference to the accompanying drawings, in which.

The figures are purely diagrammatic and not drawn to scale. In the Figures, elements which correspond to elements already described may have the same reference numerals.

DETAILED DESCRIPTION OF EMBODIMENTS

Figure 1A:
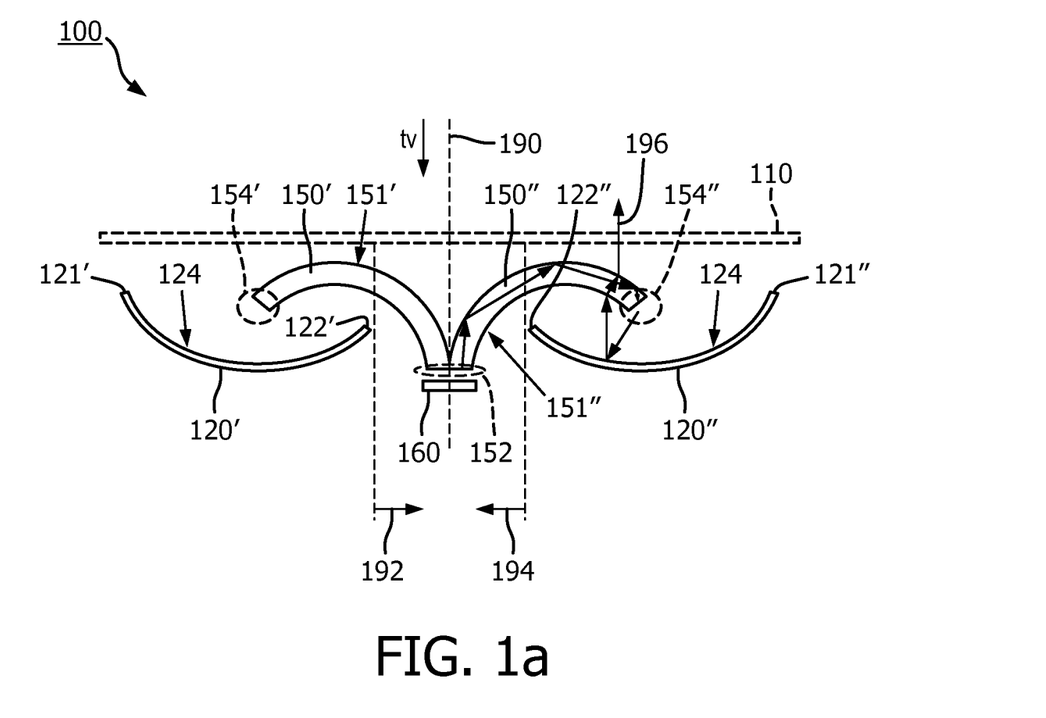
FIG. 1a schematically shows a cross-sectional view of a first embodiment of a solid state light emitter lighting assembly, FIG. 1b schematically shows a top view of the first embodiment of the solid state light emitter lighting assembly of FIG. 1a seen along an indicated direction tv, FIG. 1c schematically shows a three dimensional view of a top side of the first embodiment of the solid state light emitter lighting assembly, FIG. 2a schematically shows a three dimensional view of a top side of a second embodiment of the solid state light emitter lighting assembly, FIG. 2b schematically shows a three dimensional view of a bottom side of the second embodiment of the solid state light emitter lighting assembly, FIG. 3a schematically shows a three dimensional view of a top side of a third embodiment of the solid state light emitter lighting assembly, FIG. 3b schematically shows a three dimensional view of a bottom side of the third embodiment of the solid state light emitter lighting assembly, FIG. 4a schematically shows a three dimensional view of a top side of a fourth embodiment of the solid state light emitter lighting assembly, FIG. 4b schematically shows a three dimensional view of a bottom side of the fourth embodiment of the solid state light emitter lighting assembly, FIG. 4c schematically shows a cross-sectional view of the fourth embodiment of the solid state light emitter lighting assembly, FIG. 4d schematically shows a cross-sectional view of a fifth embodiment of the solid state light emitter lighting assembly, FIG. 5a schematically shows a three dimensional view of a top side of a sixth embodiment of the solid state light emitter lighting assembly, FIG. 5b schematically shows a three dimensional view of a bottom side of the sixth embodiment of the solid state light emitter lighting assembly, FIG. 6 schematically shows in a cross-sectional view and embodiment of an adapted mirror shape, FIG. 7a schematically shows a cross-sectional view of a seventh embodiment of a solid state light emitter lighting assembly, FIG. 7b schematically shows a cross-sectional view of an eight embodiment of a solid state light emitter lighting assembly, FIG. 7c schematically shows a three dimensional view of the seventh embodiment of the solid state light emitter lighting assembly, FIG. 7d schematically shows an embodiment of the second end of the lighting guide of the seventh or eighth embodiment of the solid state light emitter lighting assembly, FIG. 7e schematically shows another embodiment of the second end of the lighting guide of the seventh or eighth embodiment of the solid state light emitter lighting assembly, FIG. 8 schematically shows a chart with a simulated light emission distribution of the first embodiment of the solid state light emitter lighting assembly, FIG. 9 schematically shows a side view of a detail of a light guide, FIG. 10 schematically shows the use of a second reflector, FIG. 11 schematically shows an embodiment of an elongated solid state light emitter lighting assembly, and FIG. 12 schematically shows an embodiment of a luminaire.

FIG. 1a schematically shows a cross-sectional view of an embodiment of a solid state light emitter lighting assembly 100. The solid state light emitter lighting assembly 100 comprises a light exit window 110, a reflector 120', 120", a light guide 150', 150", and a solid state light emitter 160.

In use, the solid state light emitter lighting assembly 100 emits a light beam into a surroundings of the solid state light emitter lighting assembly 100 through the light exit window 110. This light exit window 110 is drawn with dashed lines which means that there may be a physical layer through which the light is emitted into the surroundings, but it may also be a virtual plane at a front side of the solid state light emitter 100 through which light is emitted into the surroundings. In other words, the term "window" must be interpreted widely: it may also be an aperture that is not covered with a transparent/translucent material. The light exit window 110 may be arranged perpendicular to a central light ray of the light beam that is emitted into the surroundings. In an embodiment, the light exit window 110 is a transparent plate, for example, made of glass or made of a transparent light transmitting material. The light exit window 110 may comprise structures for influencing the light beam that is emitted into the surroundings. Such structures are, for example, scattering or diffusion structures. If the light beam that is going to be emitted into the surroundings has a relatively narrow Full Width Half Maximum (FWHM) light emission angle, then the light exit window 110 does most probably not scatter or diffuse the light.

The reflector 120', 120" is arranged in the solid state light emitter lighting assembly 100 such that is reflects impinging light towards the light exit window 110. The reflector 120', 120" has a curved reflective surface 124 and has at least one edge that bends towards the light exit window 110. In the example of FIG. 1a, in the cross-sectional view, a left curved part 120' and a right curved part 120" of the reflector are shown. As will be discussed later, the reflector 120', 120" is rotational symmetrical around an axis 190 of the solid state light emitter lighting assembly 100 and, thus, the left curved part 120' and the right curved part 120" are connected to each other. In the example of FIG. 1a, the reflector 120', 120" has two edges that bend towards the light exit window 110 which are the inner edge and the outer edge. The left curved part 120' shows outer edge 121' and the inner edge 122'. The right curved part 120" shows the outer edge 121" and the inner edge 122". The "bending towards the light exit window" means that the edge(s) have a position closer to the light exit window that other parts of the reflector 120', 120" have.

The reflector 120', 120" may be made of a metal that has a reflective surface. The reflector 120', 120" may be made of another suitable material, for example, a plastic that is coated with a reflective material. If the reflector is made of a plastic, the reflector 120', 120" may be manufactured by means of an injection molding process and in specific cases also by means of an extrusion process. The reflective layer is subsequently provided on the manufactured part. The reflector 120', 120" may also be made by means of an additive manufacturing technology, such as 3d printing, in which a plastic, a ceramic or a metal is used to create the shape of the reflector 120', 120". The reflector 120', 120" may also be a v-grooved dielectric reflector that makes use of two total internal reflections instead of e.g. a metallic reflection.

The light guide 150', 150" as shown in the example of FIG. 1a comprises two sections in the cross-sectional view, a left section 150' and a right section 150". As will be shown in FIGS. 1b and 1c, the light guide is a single pieces that is rotational symmetrical and, therefore two sections 150', 150" are visible in the cross-sectional view. The light guide 150', 150" has a first end 152 that is arranged to receive light from the solid state light emitter 160 and through which light is coupled into the light guide 150', 150", in other words, the first end 152 is for incoupling light. The light guide 150', 150" has a second end 154', 154" through which light is outcoupled and emitted towards the reflector 120', 120". In between the first end 152 and the second end 154', 154", the light guide 150', 150" has side surfaces 151, 151'. The second end 154', 154" emits the light in directions away from the light exit window 110. Directions away from the light exit window 100 and towards the reflector 120', 120" are directions that are not directly directed towards the light exit window 110 and are directed from the second end 154', 154" towards the reflector 120', 120".

The light guide 150', 150" guides the incoupled light from the first end 152 towards the second end 154', 154" by means of total internal reflection. It is to be noted that a relatively large portion of the light that is coupled into the light guide is guided by total internal reflection towards the second end 154', 154" and that a relatively small portion of the light may be lost through the side surfaces 151', 151". Optionally, not more than 10% of the light that is coupled into the light guide 150', 150" leaves the light guide 150', 150" through the side surfaces 151', 151". Optionally, not more than 5% of the light that is coupled into the light guide 150', 150" leaves the light guide 150', 150" through the side surfaces 151', 151". In an optional embodiment, the light guide 150', 150" is shaped such that it does not have a sharp curve and, thus, a low amount of light is leaked. An effect of a low amount of light leakage through the side surfaces 151', 151" is that the risk of the experience of glare is strongly reduced and that the efficiency of the solid state light emitter lighting assembly 100 is increased. In the book "Introduction to nonimaging optics" of J. Chaves and published by CRC press geometrical characteristics of the light guides are discussed that prevent the leakage of light in between the first end 152 and the second end 154', 154".

The first end 152 of the light guide is arranged at such a position such that it receives a relatively large portion of the light emitted by the solid state light emitter 160. The second end 154', 154" of the light guide 150', 150" is arranged at such a position that the light that is coupled out of the light guide 150', 150" is emitted towards the reflector 120', 120". As will be discussed later, the solid state light emitter 160 is arranged at a first side of the bending (inner) edge 122', 122" of the reflector and, as such, the light guide 150', 150" has the function to transport the light emitted by the solid state light emitter 160 over the bending (inner) edge 122', 122" towards the reflector 120', 120". It can also be seen in FIG. 1a that the light guide extends for a relatively long distance in between the light exit window 110 and the reflector 120', 120". For example, seen in a direction parallel to the light exit window 110 and seen in a cross-sectional view, the light guide 150', 150" extends between the light exit window 110 and the reflector 120', 120" for a distance that is at least 25% of the length of the reflector 120', 120" in this cross-sectional view along said direction. For example, seen in a direction parallel to the light exit window 110 and seen in a cross-sectional view, the light guide 150', 150" extends between the light exit window 110 and the reflector 120', 120" for a distance that is at least 35%, or at least 40%, of the length of the reflector 120', 120" in this cross-sectional view along said direction. The light guide 150', 150" is made of a light transmitting material, optionally, a transparent material. The light guide 150', 150" may be made of glass or a light transmitting plastic. Examples of suitable material are PMMA (Poly(methyl methacrylate)), PC (Polycarbonate)

and Silicone. A more general example is a transparent/clear dielectric material. The light guide 150', 150" may be manufactured by means of an injection molding or an injection compression molding process or, depending on the shape of the light guide, by means of an extrusion process. The light guide 150', 150" may also be manufactured by means of an additive manufacturing technology such as 3d printing.

The solid state light emitter 160 is for emitting light. The solid state light emitter 160 is arranged at a position where it emits, in use, light towards the first end 152 of the light guide 150', 150". The solid state light emitter 160 has also a position at a first side of the one of the bending inner edge 122', 122" or bending outer edge 121', 121". In the example of FIG. 1a, the solid state light emitter 160 is position at the first side of the bending inner edge 122', 122". At the first side means, seen in (virtual) plane parallel to the light exit window, at a side of the bending edge that is away from the reflective surface 124. In other words: the bending edge subdivides the space into a side where the reflective surface 124 of the reflector 120', 120" is present and a side where the reflective surface 124 is not present and the first side is the area where the reflective surface 124 is not present. Consequently, in a top view (FIG. 1b), the solid state light emitter 160 and the reflective surface 124 do not overlap. In FIG. 1a, the arrows 192, 194, together with the dashed lines to which the arrows 192, 194 are coupled, indicate which area is the first side. It is to be noted that there is also a first area that relates to the outer bending edge 121', 121". This is the area left and right of, respectively, the left part of the reflector 120' and the right part 120" of the reflector. It is also to be noted that the solid state light emitter 160 may be located at a higher position, which means, closer to the light exit window, and may also be located at a lower position that it is drawn in FIG. 1a.

The solid state light emitter may be a light emitting diode (LED). Other solid state light emitters may be used as well, such as a laser diode. In some embodiments the solid state light emitter may be a blue light emitting LED, such as GaN or InGaN based LED, for example emitting primary light of the wavelength range from 440 to 460 nm. Alternatively, the solid state light source may emit UV or violet light which is subsequently converted into light of longer wavelength(s) by one or more wavelength converting materials. Nevertheless, the LED might also be a direct phosphor converted LED having a Correlate Color Temperature of 1,700 up to 20,000K. The solid state light emitter may have more elements than only a semiconductor element. The solid state light emitter may, for example, comprise a specific package. Examples are Chip-on-board packages (COB), Multi-die single emitter packages (MDSE) and Chip-scaled packages (CSP). Also Light Emitter Diodes that emit a specific color, such as, for example, blue, green, yellow, red, orange, lime, etc. can be used.

The reflector 120', 120" reflects the impinging light towards the light exit window 110. A portion of the reflected light is transmitted through the side surfaces 151', 151" of the light guide 150', 150". In other words, this portion of light impinges not on the first end 152 and not on the second end 154', 154", but impinges ones some of the surfaces of the light guide 150', 150" that are in between the first end 152 and the second end 154', 154".

A path of an example of one of the light rays 196 is drawn in FIG. 1a. As can be seen this light ray 196 is reflected by means of total internal reflection in the light guide 150" and the light ray 196 is transmitted towards the second end 154" of the light guide 150". At the second end 154" the light ray is transmitted towards the right part of the reflector 120" where it is reflected towards the light exit window 110. The light ray 196 impinges at a specific position at the side surfaces 151' of the light guide 150". At this position the light ray 196 is transmitted into the light guide 150" and is transmitted towards an opposite side surface 151" of the light guide 150" where the light ray 196 leaves the light guide 150" towards the light exit window 110.

Figure 1B:
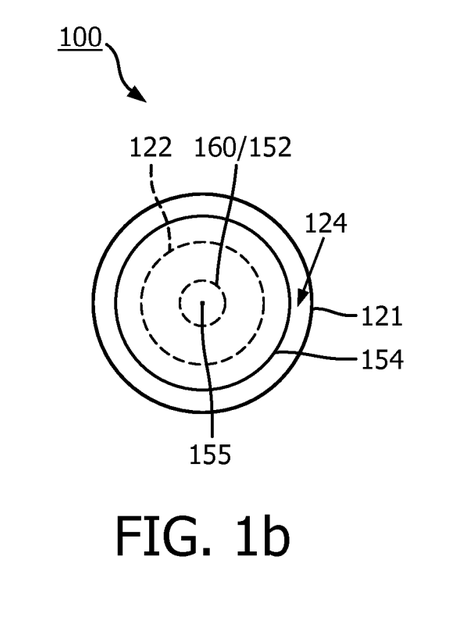

FIG. 1b schematically shows a top view of the embodiment of the solid state light emitter lighting assembly 100 of FIG. 1a seen along an indicated direction tv. The direction tv is a direction from the light exit window 110 towards the reflector 120', 120". FIG. 1b shows the reflective surface 124, the outer (bending) edge 121, the second end 154 of the light guide. A dashed line shows the inner (bending) edge 122 of the reflector. The line is dashed because it is, seen in the top view, behind the light guide. Dashed line 160/152 shows where the first end 152 of the light guide is and where the solid state light emitter is located. It is not necessary that, seen in the top view, the solid state light emitter 160 and the first end 152 have the same size and/or same shape. Point 155 is a point of the light guide where, as seen in FIG. 1a, parts of the light guide come together at a position close to the first end 152.

Figure 1C:
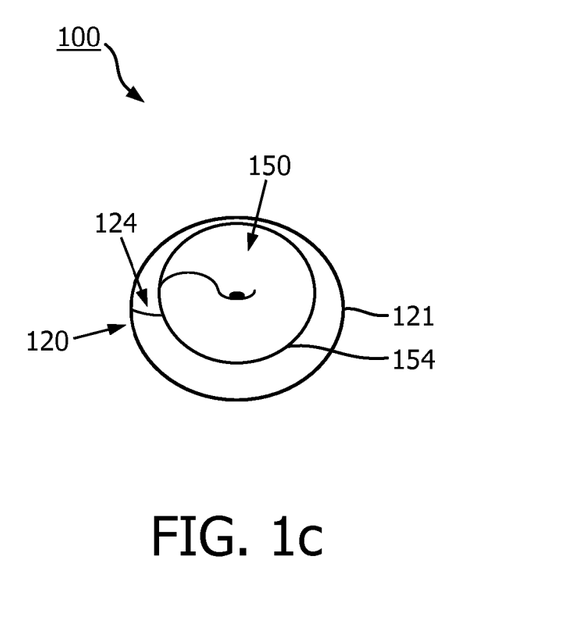

FIG. 1c schematically shows a three dimensional view of the embodiment of the solid state light emitter lighting assembly 100. In FIG. 1c, the outer bending edge 121 of the reflector 120 is shown. It can been seen that the reflective surface is curved. One can also identify the light guide 150 and point 155 that is discussed in the context of FIG. 1b. The line that is indicated with 154 is the second end of the light guide 150.

In the embodiments of the solid state light emitter 100 of FIGS. 1a to 1c, the light guide 150', 150" has also the function to collimate the light into the rotational direction. The reflector 120', 120" subsequently collimates the light in the radial direction. By having the possibility to use two elements for the collimation of the light, a better solid state light emitter lighting assembly can be obtained that emits a light beam that is relatively narrow, for example, having a light emission distribution that has a full width half maximum (FWHM) width of 7 degrees.

In the example of FIGS. 1a to 1c, and also in embodiments that are discussed hereinafter, the light guide 150, 150', 150" changes the direction of the light that is emitted by the solid state light emitter 160 significantly, e.g. at least 90 degrees, or at least 120 degrees. Thereby the light emission direction is almost reverted by the light guide 150, 150', 150".

Figure 2A:
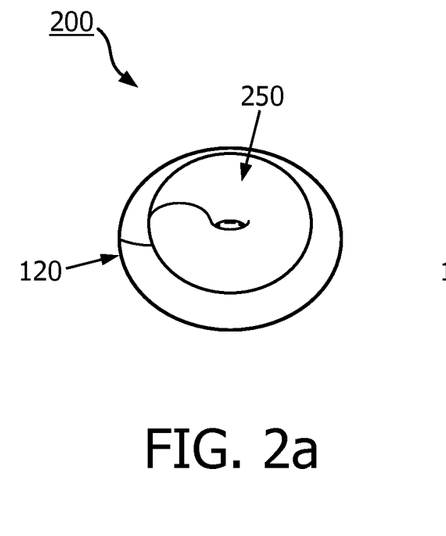
Figure 2B:
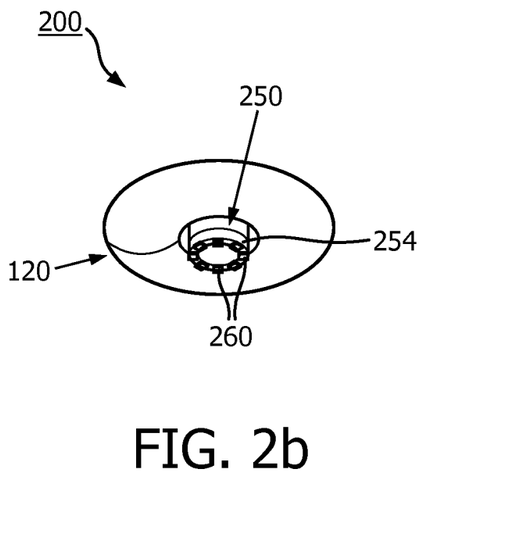

FIG. 2a schematically shows a three dimensional view of a top side of a second embodiment of the solid state light emitter lighting assembly 200. FIG. 2b schematically shows a three dimensional view of a bottom side of the second embodiment of the solid state light emitter lighting assembly 200. The second embodiment of the solid state light emitter lighting assembly 200 has similar embodiments, characteristics effects and advantages as the first embodiment of the solid state light emitter lighting assembly 100 and element that are different in the second embodiment are discussed hereinafter. In FIG. 2a the reflector 120 and the light guide 250 are shown. The reflector 120 has equal embodiments as the reflector of FIGS. 1a to 1c. As can be seen in FIG. 2b, the light guide 250 is slightly different. More in particular, the second end 254 is ring shaped. The solid state light emitter lighting assembly 200 has a plurality of solid state light emitters that emit light towards the ring shaped second end 254 of the light guide 250. An effect of the use of a plurality of solid state light emitters 260 is that more light may be coupled into the light guide, that solid state light emitters 260 may be used that are cheaper because they may have to emit, per solid state light emitter 260, only a portion of the total light emitted by the solid state light emitter lighting assembly 200. It may also improve the thermal management of the solid state light emitter lighting assembly 200: the individual solid state light emitters 260 may become less warm than one single solid state light emitter and all the heat that is generate by the solid state light emitters 260 is generated at different locations and, therefore, it is easier to spread the heat towards different locations in the solid state light emitter lighting assembly 200.

Figure 3A:
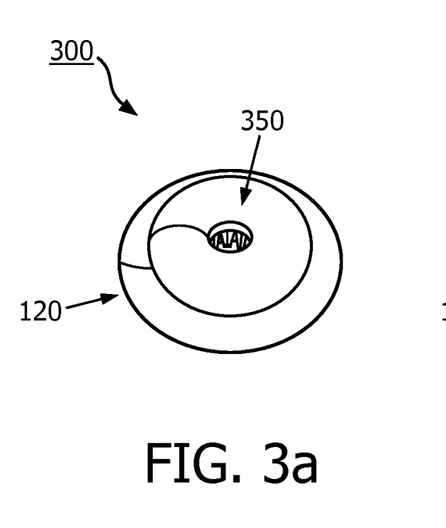
Figure 3B:
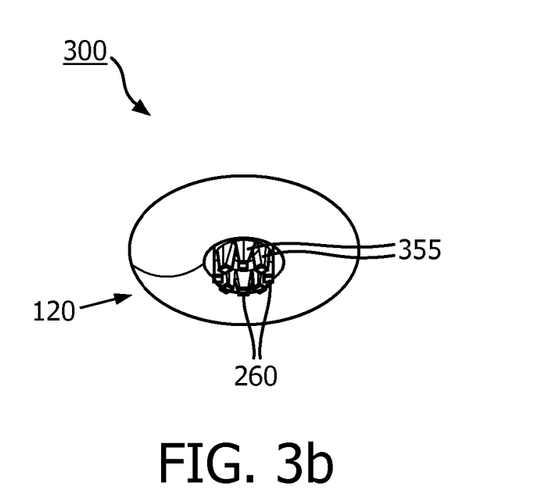

FIG. 3*a* schematically shows a three dimensional view of a top side of a third embodiment of the solid state light emitter lighting assembly 300. FIG. 3*b* schematically shows a three dimensional view of a bottom side of the third embodiment of the solid state light emitter lighting assembly 300. The third embodiment of the solid state light emitter lighting assembly 300 has similar embodiments, characteristics effects and advantages as the second embodiment of the solid state light emitter lighting assembly 200 and element that are different in the third embodiment are discussed hereinafter. In the solid state light emitter lighting assembly 300, the second end of the light guide 350 is formed by a plurality of structures 355 that are, for example, truncated pyramids wherein the surface formed at the truncated side of the pyramid forms a window that receives light of one of the solid state emitters 260 and couples this light into the light guide 350. The structure 355 at the second end may also have another shape, for example, a shape of a truncated wedge or a truncated cone. Or, in another example, the structures 355 at the second end of the light guide 350 have a shape of a trapezoidal prism. The idea behind the structures 355 is that the light guide 350 has several light-input windows that receive light from a respective one of the plurality of solid state light emitters 260. An effect of the structures is that the sagittal collimation is improved and, thus, that a more narrow light beam can be emitted by the solid state light emitter lighting assembly 300.

Figures 4A, 4B:
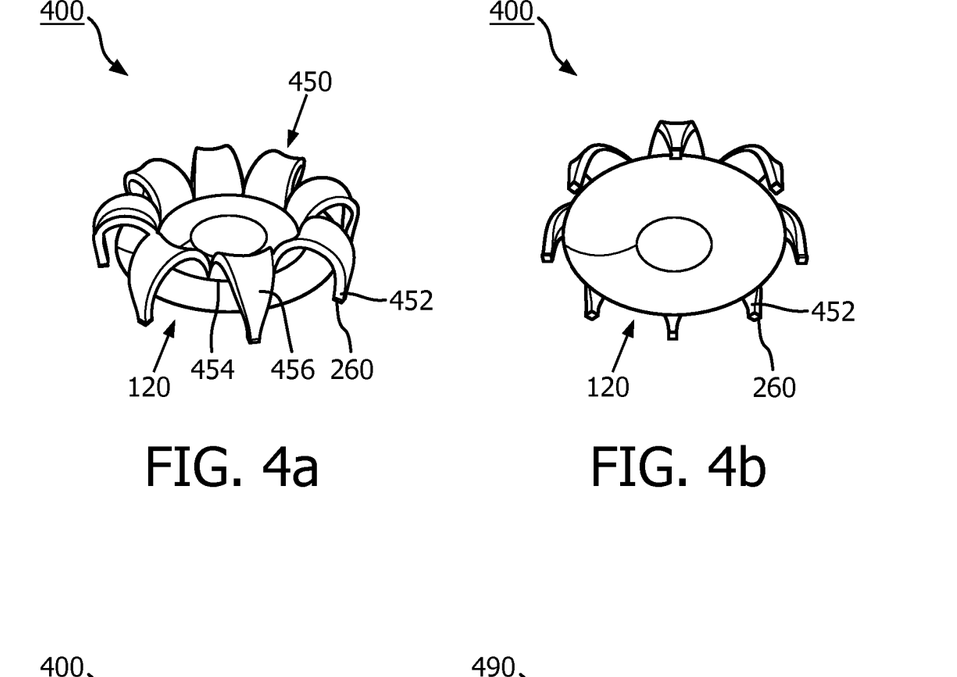
Figure 4C:
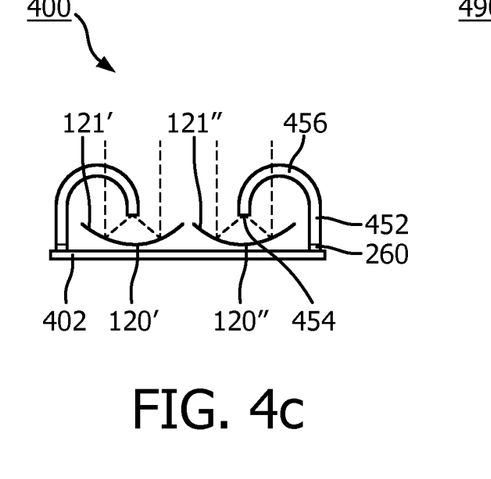

FIG. 4*a* schematically shows a three dimensional view of a top side of a fourth embodiment of the solid state light emitter lighting assembly 400. FIG. 4*b* schematically shows a three dimensional view of a bottom side of the fourth embodiment of the solid state light emitter lighting assembly 400. FIG. 4*c* schematically shows a cross-sectional view of the fourth embodiment of the solid state light emitter lighting assembly 400. The fourth embodiment of the solid state light emitter lighting assembly 400 has similar embodiments, characteristics effects and advantages as the second embodiment of the solid state light emitter lighting assembly 200 and element that are different in the fourth embodiment are discussed hereinafter.

As discussed previously, it is not necessary that the solid state light emitters 260 are located near a central axis of the solid state light emitter lighting assembly, but they may also be located at a first side of the outer bending edge 121', 121" of the reflector 120, 120', 120", thus at a side of the outer bending edge 121', 121" that is away from the reflective surface. This also means that the light guide 450 has a different shape because the light must be transported from a position (or from positions) at the outside area of the solid state light emitter lighting assembly 400 towards the reflector 120. In the specific embodiment of the solid state light emitter lighting assembly 400, the light guide 450 is formed by a plurality of light guiding elements 456. The light guiding elements 456 have a first end where light is received from a respective one of the solid state light emitters 260 and where the light is coupled into the light guiding element 456. At another side of the light guiding element 456, the light guiding element 456 has a second end and all second ends of the light guiding elements 456 form the second end 454 of the light guide 450 as a whole. In the example of FIGS. 4*a* to 4*c*, the shape of the light guiding element 456 is the shape of a trapezoidal prism that is curved around the outer edge 121', 121" of the reflector 120, 120', 120". FIG. 4*c* shows an additional element, namely base plate 402 which forms a base of the solid state light emitter lighting assembly 400 and/or forms a plate on which the solid state light emitters 260 are provided. The base plate 402 may be a printed circuit board that also comprise the circuitry to provide power to the solid state light emitters 260. The base plate 402 may also support the reflector 120 (not shown) and may also be coupled to a housing (now shown) of the solid state light emitter lighting assembly 400. All embodiments discussed in this application may be provided with a base plate and/or a housing.

Figure 4D:
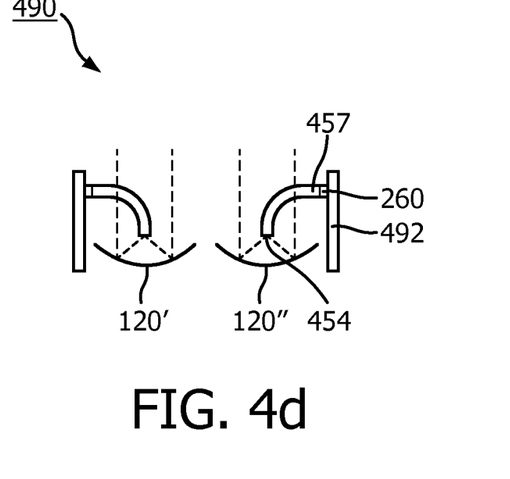

FIG. 4*d* schematically shows a cross-sectional view of a fifth embodiment of the solid state light emitter lighting assembly 490. The solid state light emitter lighting assembly 490 is similar to solid state light emitter lighting assembly 400 of FIGS. 4*a* to 4*c* and has similar embodiments, advantages and effects. A difference between solid state light emitter lighting assembly 400 and solid state light emitter lighting assembly 490 is that in solid state light emitter lighting assembly 400 the solid state light emitters 260 emit light into a direction towards the light exit window, while in the solid state light emitter lighting assembly 490, the light solid state light emitters 260 emit light in a direction towards a central axis of the solid state light emitter lighting assembly 490. Thus, the light guiding elements 457 of the light guide of the solid state light emitter lighting assembly 490 are differently shaped and the solid state light emitters 260 are arranged on, for example, one or more support structures 492. The support structure 492 may be a single support structure for each solid state light emitter 260 or may be a ring shaped support structure on which the different solid state light emitters are arranged. The support structure 492 may also be a ring shaped printed circuit board that also comprises the circuitry to provide power to the solid state light emitters 260. The support structure 492 may also be the side wall of a housing of the solid state light emitter lighting assembly 490.

In the context of FIGS. 4*a* to 4*d* an advantage is that the solid state light emitters are positioned close to the outside housing of the solid state light emitter lighting assembly 400, 490. This is useful for a designing a good thermal management. It is relatively easy to transport the heat that is generated in the solid state light emitters 260 towards an outside surface of the solid state light emitter lighting assembly 400, 490 such that heat can be easily transferred to the surroundings. A distance between the solid state light emitters 260 is also larger such that the heat that is generated in one of the solid state light emitters 260 does not much heat up a neighboring solid state light emitter. Another advantage of the solid state light emitter lighting assemblies 400, 490 is that the use of individual light guiding elements 456, 457 improves the collimation such that a collimation closer to the Etendue limit can be obtained.

Figure 5A:
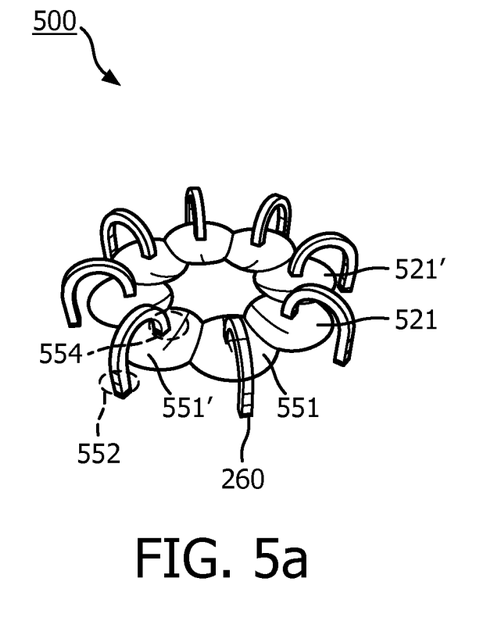
Figure 5B:
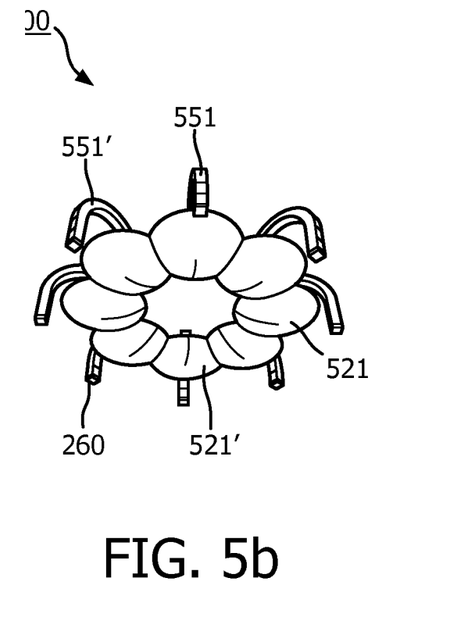

FIG. 5*a* schematically shows a three dimensional view of a top side of a sixth embodiment of the solid state light emitter lighting assembly 500. FIG. 5*b* schematically shows a three dimensional view of a bottom side of the sixth embodiment of the solid state light emitter lighting assembly

500. The sixth embodiment of the solid state light emitter lighting assembly 500 has similar embodiments, characteristics effects and advantages as the fourth embodiment of the solid state light emitter lighting assembly 400 and element that are different in the sixth embodiment are discussed hereinafter. The solid state light emitter lighting assembly 500 has a plurality of solid state light emitters 260. The reflector of the solid state light emitter lighting assembly 500 is formed by a plurality of reflectors 521, 521'. The light guide of the solid state light emitter lighting assembly 500 is formed by a plurality of light guiding elements 551, 551'. Each light guiding element 551, 551' has a first end 552 and a second end 554. The first end of a respective one of the light guiding elements 551, 551' receives light from a respective one of the solid state light emitters 260 and couples the impinging light into the light guiding element 551, 552'. The second end of a respective one of the light guiding elements 551, 551' emits the light towards a respective one of the reflectors 521, 521'. A cross-sectional shape of the light guiding elements 551, 551' may be circular, square or may be any other appropriate shape. When a rectangular/square cross-sectional shape is used for the light guiding elements 551, 551', the amount of light leakage in between the first end 552 and the second ends 554 is kept low. The reflectors 521, 521' reflect the light towards the light exit window and the combination of reflected light beams forms together the emitted light beam of the solid state lighting emitter lighting assembly 500 as a whole.

Figure 6:
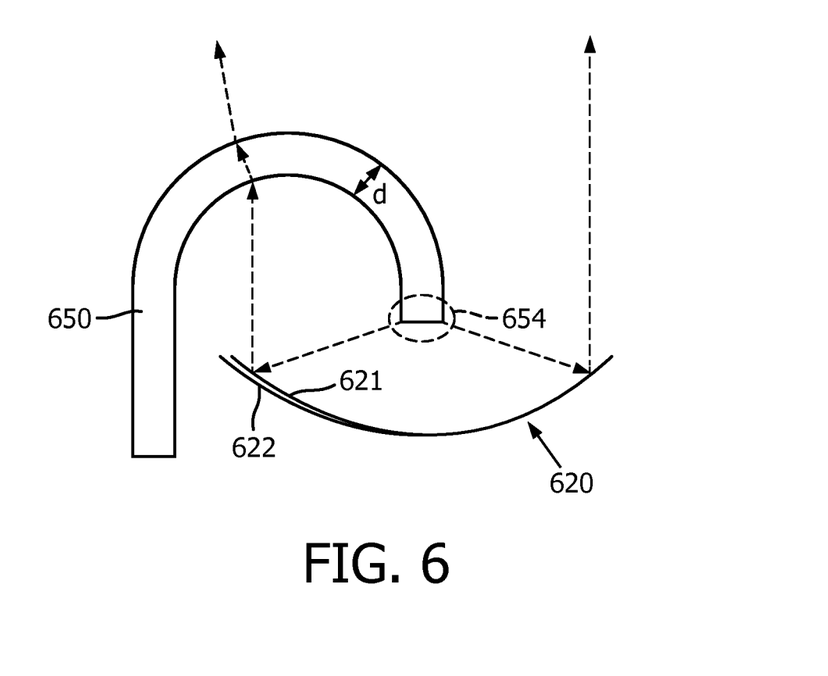

FIG. 6 schematically shows how a cross-sectional shape of a mirror 620 of which the cross-sectional shape is adapted. FIG. 6 shows the mirror 620 and a cross-sectional shape of a light guide 650. It is to be noted that the shown cross-section of the mirror 620 may relate to any mirror that is discussed in this application. It is also to be noted that the shown cross-section of the light guide 650 may relate to any light guide that is discussed in this application. As discussed previously, a portion of the light that is reflected by the mirror 620 is transmitted through the side surfaces of the light guide 650. The light guide slightly disturbs the light rays by off shifting them from their original position with respect to a central axis of the mirror 620 and may slightly contribute to a diverging light beam instead of an optimally collimated light beam. One option to correct for this effect is by changing the cross-sectional shape of the mirror 620, in particular that part of the mirror 620 that reflects the light towards the side surfaces of the light guide 650. For example, if the mirror 620 would have, if no light is to be transmitted through the light guide via the side surfaces, a parabolic shape 621, one may correct a portion of the mirror 620 by creating a slightly off-parabolic shape 622 at the area where light is transmitted towards the side surfaces of the light guide 650. Light ray transmission simulation programs can be used to calculate the optimal shape for the mirror 620 to obtain a specific light beam that must be emitted into the surroundings even if a portion of the light is transmitted through the light guide 650.

Another degree of freedom in the solid state light emitter lighting assemblies is the exact shape of the light guide. In most of the presented drawing the cross-sectional depth d of the light guide 650 is uniform along the light guide 650. One may also vary the depth d of the light guide 650 along the light guide 650 to correct for negative effects of the light guide on the collimation of the light beam that is transmitted through the light exit window.

In this context it is also noted that light that is reflected by the mirror 620 and that is transmitted towards the second end 654 of the light guide 650 may impinge on sharp edges of the light guide 650 this light may be scattered. The scattered light may distort the light beam that is emitted through the light exit window and may contribute to an inefficiency of the solid state light emitter lighting assembly. These effects may be prevented by locally adapting the mirror 620 such that light is not reflected towards the sharp edges of the light guide 650. These effects may also be prevented by adapting the second end 654 of the light guide 650 such that the light distribution that is emitted towards the mirror does not comprise much light at a specific portion of the mirror 620 where light is reflected towards the second end 654 of the light guide 650.

In this context it is also to be noted that the second end 654 of the light guide 650 may comprise a specific structure to obtain a certain light distribution towards the mirror such that, when the light is reflected towards the light exit window and is emitted through the light exit window into the surroundings, the obtained light beam is within predefined requirements. The second end 654 may, for example, be wedge shaped (at least in a cross-sectional view), may be flat, may comprise one or more facets, may have a curved portion, or may be any combination of these shapes.

Figure 7A:
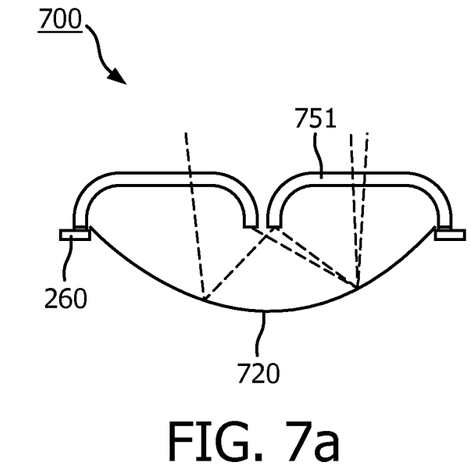

FIG. 7a schematically shows a cross-sectional view of a seventh embodiment of a solid state light emitter lighting assembly 700. FIG. 7c schematically shows a three dimensional view of the seventh embodiment of the solid state light emitter lighting assembly 700. The example of solid state light emitter lighting assembly 700 shows that, if the solid state light emitters 260 are arranged near an outside surface of the solid state light emitter lighting assembly 700, one may also use one reflector that has a radius that is only slightly smaller than the radius of the solid state light emitter lighting assembly 700 as a whole. This can be applied in previously discussed solid state light emitter lighting assemblies, for example, solid state light emitter lighting assembly 400, 490, 500. The second ends of the light guiding structures 751 are arranged close to, seen in a top view, a central point of the reflector. The example of FIG. 7c shows four solid state light emitters 260 and four light guiding structures 751. Embodiments are not limited to this number and any other appropriate number can be used as well.

A cross-sectional shape of the reflector 720 is, in general a convex shape. Optionally, the cross-sectional shape of the reflector 720 may be a convex shape, for example, a parabolic shape or a portion of a circle. This also applied to cross-sectional shapes of previously discussed reflectors. For example, the left cross-sectional part 120' of reflector 120 of FIG. 1a may also be parabolic or have a shape that follows a portion of a circle. The second end of the light guide may be arranged close to the focal point of the reflector.

Figure 7B:
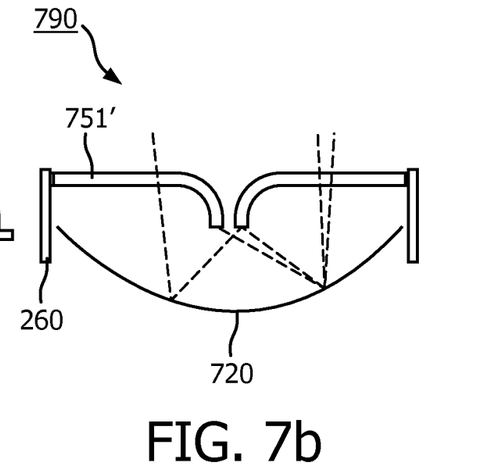
Figures 7C, 7D:
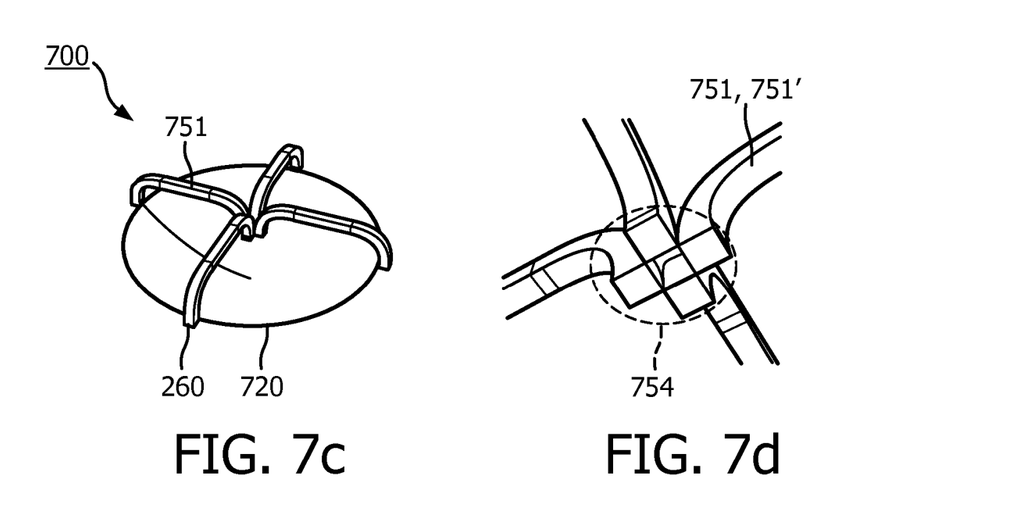

FIG. 7b schematically shows a cross-sectional view of an eight embodiment of a solid state light emitter lighting assembly 790. Solid state light emitter lighting assembly 790 has similar embodiments, characteristics effects and advantages as the second embodiment of the solid state light emitter lighting assembly 700 of FIGS. 7a and 7c. A difference is that the solid state light emitters 260 are differently positioned. In the solid state light emitter lighting assembly 700 the light emitters emit into the direction of the light exit window and in the solid state light emitter lighting assembly 790 the light emitters 260 emit into a direction towards a central axis of the solid state light emitter lighting assembly 790. The light guiding structures 751' are adapted accordingly.

FIG. 7d schematically shows an embodiment of the second end 754 of the lighting guide of the seventh or eighth embodiment of the solid state light emitter lighting assembly 700, 790. Where the light guiding elements 751, 751' come together they form together the second end 754 of the light guide.

Figure 7E:
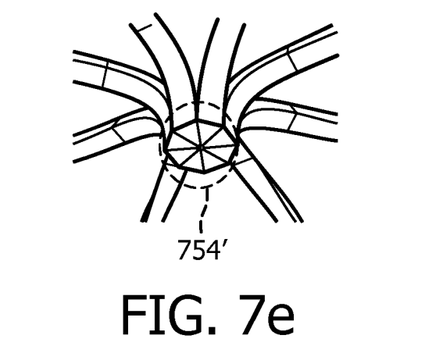

FIG. 7e schematically shows another embodiment of the second end 754' of the lighting guide of the seventh or eighth embodiment of the solid state light emitter lighting assembly 700, 790. In the example of FIG. 7e, the ends of the light guiding elements 751, 751' have a triangular cross-sectional shapes and form together a regular polygon. In the example of FIG. 7e, there are eight light guiding elements 751, 751' and, as such, a cross-sectional shape of the second end 754' is an octagon. It is to be noted that embodiments of the solid state light emitter assemblies are not limited to this specific number of light guiding elements and a corresponding number of solid state light emitters.

Figure 8:
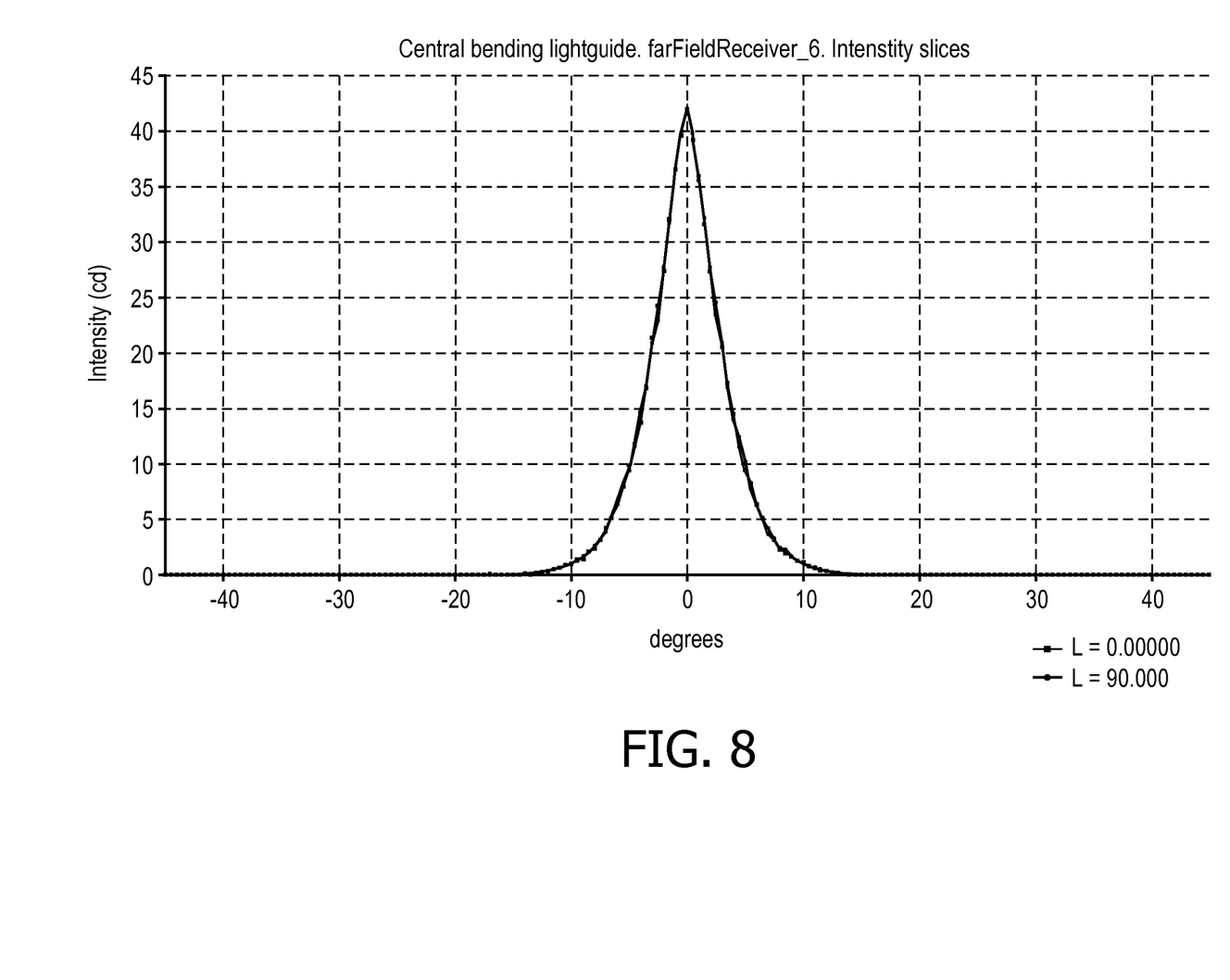

FIG. 8 schematically shows a chart of a simulated light emission distribution of the first embodiment of the solid state light emitter lighting assembly 100. The x-axis of the chart represents the light emission angle with respect to a central axis of the emitted light beam. The y-axis of the chart represents the emitted light intensity expressed in candela (cd). The simulated light beam relates to the solid state light emitter lighting assembly 100 of FIGS. 1a to 1c. The light guide 150', 150" and the mirror 120', 120" of the embodiment that is simulated are designed to obtain a relatively narrow light beam. As shown in the chart, it is possible to obtain such a narrow light beam. The simulations show that it is possible to obtain a 6.5 degree FWHM light beam. The chart of FIG. 8 relates to a simulation in which a 1 lm light emitter is used. As shown in the chart, then the absolute light beam intensity is 25000 candela. The optical efficiency is about 80% and, thus, the relative center beam intensity is about 42/0.8=52 candela per lumen. If a 6.5 mm COB light emitter (Chip-on-board packages) that has an output of 600 lm i sued, an absolute center light beam intensity of about 25000 candela can be obtained. These simulation results show that the solid state light emitter lighting assembly 100 of FIGS. 1a to 1c can be used to replace traditional AR111 lighting assembly, also when the AR111 has to emit a relatively narrow light beam and has to emit a relatively high peak intensity.

Figure 9:
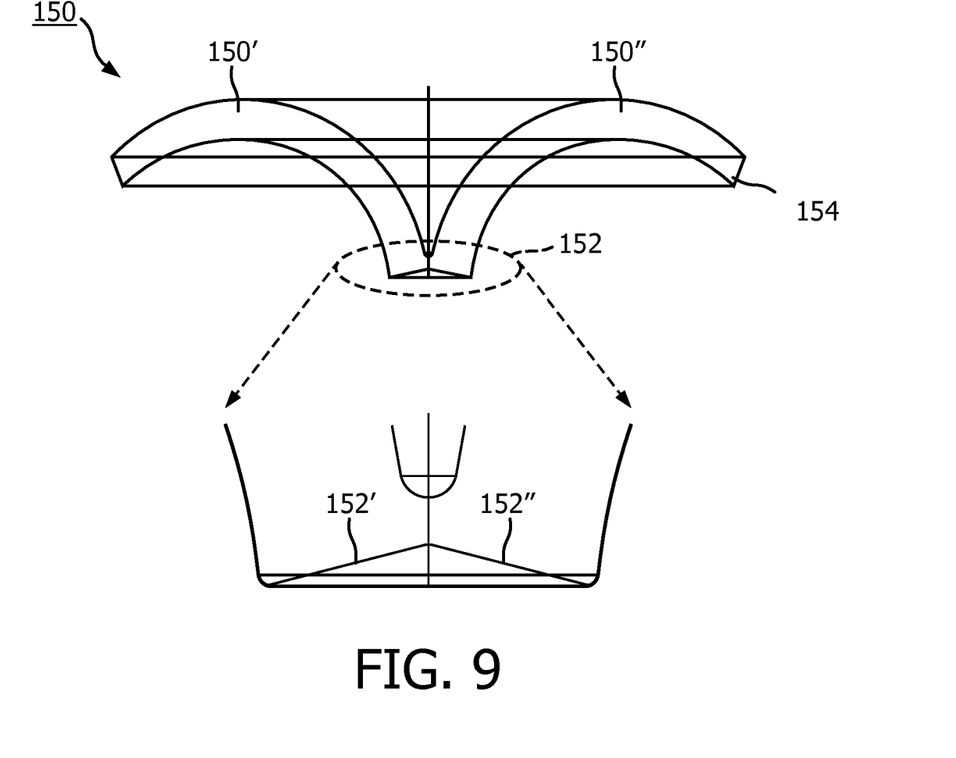

FIG. 9 schematically shows a side view of a detail of a light guide 150. FIG. 9 shows sections 150', 150" of the light guide 150. With the area between the two horizontal lines the second end 154 is schematically indicated. The first end 152 is enlarged at a bottom side of FIG. 9. The first end 152 comprises surfaces 152', 152" that form a sort of recess into the light guide. This shape of the first end 152 may assist the incoupling of light into the light guide 150. The shown central kink assists in splitting up the light beam into different beams in different direction. It is to be noted that the first end of all light guides that are presented in this document may have a specific structure to assist the incoupling of light and/or the transmission of the incoupled light into an advantage direction inside the light guide 150.

Figure 10:
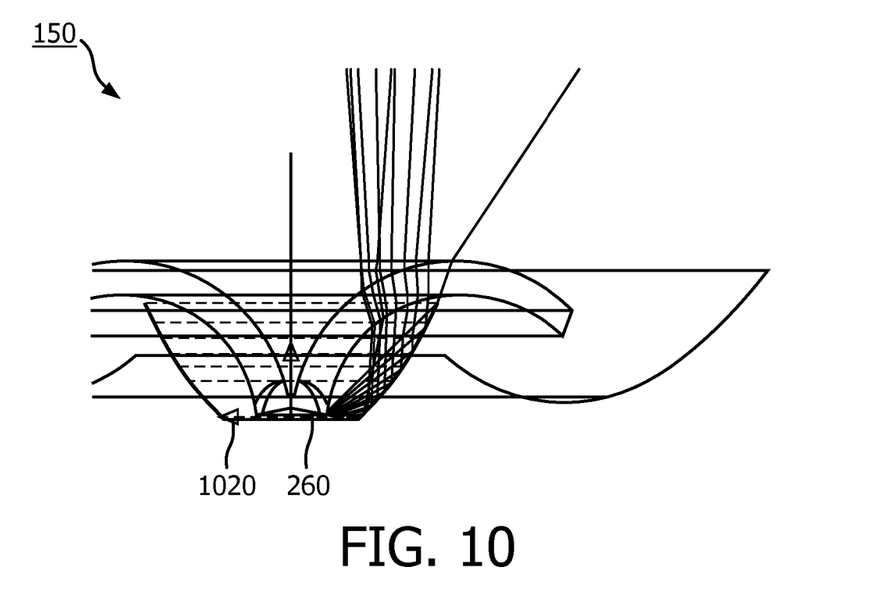

FIG. 10 schematically shows the use of a second reflector 1020. It may be that some light 1096 leaks in a sideward direction. This light may leak through a gap that is present in between the first end of the light guide 150 and the solid state light emitter 260, or a side surface of the solid state light emitter 260 may emit light. The second reflector 1020 may be used to reflect this light towards the light exit window as shown in FIG. 10. It may also be that the second reflector 1020 is used to emit light back towards the first end of the light guide 150. Thereby the second reflector 1020 contributes to a higher peak intensity of the solid state light emitter lighting assembly, contributes to a higher efficiency and contributes to a limited distortion of the emitted light beam by the light that is not directly coupled into the light guide 150.

Figure 11:
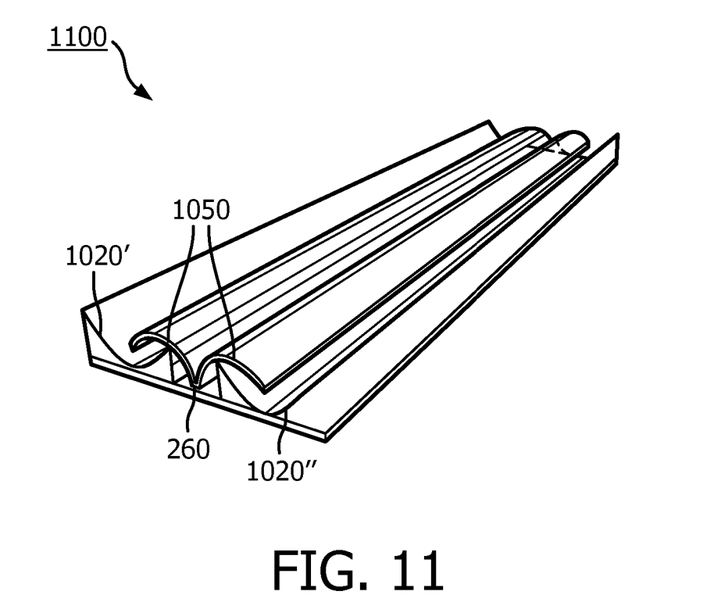

FIG. 11 schematically shows an embodiment of an elongated solid state light emitter lighting assembly 1100. The reflector has an elongated left reflector 1020' and an elongated right reflector 1020" and an elongated light guide 1050. A cross-sectional view of the elongated solid state light emitter lighting assembly 1100 is similar to the cross-sectional view of the previously discussed solid state light emitter lighting assembly 100 of FIGS. 1a to 1c. Embodiments, effects and advantages that are discussed in the context of other solid state light emitter lighting assemblies, for example, of solid state light emitter assembly 100, also apply to the elongated solid state light emitter lighting assembly 1100 in so far these embodiment, effects and advantages also apply to the elongated configuration that is presented in FIG. 11.

Figure 12:
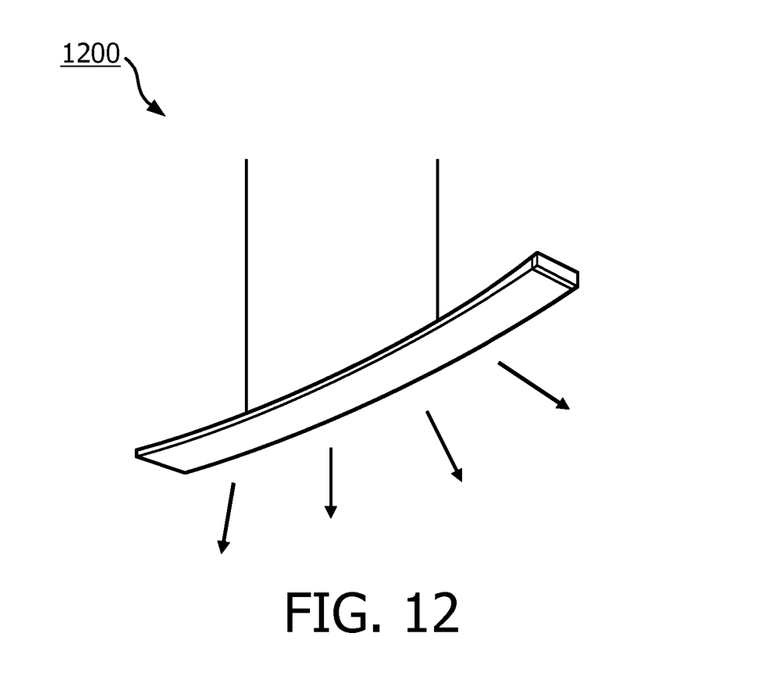

FIG. 12 schematically shows an embodiment of a luminaire 1200. The luminaire comprises one or more solid state light emitter lighting assemblies (not shown separately in FIG. 12) of one of the previously discussed embodiments.

A solid state light emitter lighting assembly and a luminaire are provided. The solid state light emitter assembly comprises a light exit window, a reflector, a light guide and a solid state light emitter. The reflector reflect light towards the light exit window and has at least one edge bending towards the light exit window. The light guide receives light at a first end and emits at a second end the guided light towards the reflector. The first end is arranged at a first side of the at least one edge. The first side is away from a reflecting surface of the reflector. The solid state light emitter is also at the first side and emits light towards the first end of the light guide. A portion of the light that is reflected by the reflector is transmitted through the light guide through side surfaces of the light guide.

It will be appreciated that the above description for clarity has described embodiments of the invention with reference to different functional units. However, it will be apparent that any suitable distribution of functionality between different functional units may be used without deviating from the invention. Hence, references to specific functional units are only to be seen as references to suitable means for providing the described functionality rather than indicative of a strict logical or physical structure or organization.

It is noted, that in this document the word 'comprising' does not exclude the presence of other elements or steps than those listed and the word 'a' or 'an' preceding an element does not exclude the presence of a plurality of such elements, that any reference signs do not limit the scope of the claims. Further, the invention is not limited to the embodiments, and the invention lies in each and every novel feature or combination of features described above or recited in mutually different dependent claims.

The invention claimed is:

1. A solid state light emitter lighting assembly for emitting a beam of light, the solid state light emitter lighting assembly comprising
 a light exit window for transmitting the beam of light into a surrounding,
 a reflector being arranged to reflect impinging light towards the light exit window, the reflector having a curved reflective surface and having at least one edge bending towards the light exit window,
 a light guide having a first end for incoupling light, having a second end for outcoupling light and having side surfaces in between the first end and the second end, the light guide being arranged to substantially guide incoupled light from the first end towards the second end by total internal reflection, the first end being arranged at a first side of the at least one edge of the reflector, the first side being away from the reflecting surface, the second end being arranged at a position in between the reflector and the light exit window and being arranged to emit the outcoupled light in directions away from the light exit window towards the reflector, a solid state light emitter being arranged at the first side, the solid state light emitter being arranged to emit light towards the first end of the light guide, wherein the solid state light emitter being arranged outside the reflector, and wherein, in use, a portion of the light being reflected by the reflector towards light exit window is transmitted through the light guide via the side surfaces.

2. A solid state light emitter lighting assembly according to claim 1, wherein
the reflector has in at least one direction a cross sectional shape that consists of a left curved part and a right curved part, said curved parts both comprise, seen with respect to a center point of the cross sectional shape, an inner edge that bends into the direction of the light exit window, and an outer edge that bends into the direction of the light exit window, and
the solid state light emitter is provided, seen in a top view along a direction from the light exit window towards the reflector, in between the inner edges of the left curved part and the right curved part.

3. A solid state light emitter lighting assembly according to claim 2, wherein
the first end is arranged, seen in a top view along a direction from the light exit window towards the reflector, in the region in between the inner edges, and the second end is arranged, seen in a top view along a direction from the light exit window towards the reflector, in between the inner edge and the outer edge of one of the left part and the right part, or
the light guide comprises two sections both having a second end, one of the two second ends is arranged, seen in a top view along a direction from the light exit window towards the reflector, in between the inner edge and the outer edge of the left curved part, and another one of the two second ends is arranged, seen in a top view along a direction from the light exit window towards the reflector, in between the inner edge and the outer edge of the right curved part.

4. A solid state light emitter lighting assembly according to claim 2, wherein
the reflector is rotational symmetrical around an axis and having in all cross-sectional planes that comprise the axis a cross sectional shape that comprises the left curved part and the right curved part.

5. A solid state light emitter lighting assembly according to claim 4, wherein
the light guide is rotational symmetrical around the axis and having in all cross-sectional planes that comprise the axis a cross sectional shape that comprises a central part comprising the first end and one second end in between the left curved part of the reflector and the light exit window and a further second end in between the right curved part of the reflector and the light exit window.

6. A solid state light emitter lighting assembly according to any one of the claim 2, comprising a plurality of solid state light emitters provided, seen in a top view along a direction from the light exit window towards the reflector, in between the inner edges of the left curved part and the right curved part.

7. A solid state light emitter lighting assembly according to claim 6 comprising a plurality of light guides, the light guides having a first end and a second end, the individual solid state light emitters are arranged to emit light towards the second end of a respective one of the light guides.

8. A solid state light emitter lighting assembly according to claim 1, wherein the reflector comprises a plurality of curved sub-reflectors and at least one of i) the light guide comprises a plurality of second ends and the individual sub-reflectors are arranged to receive light from a corresponding one of the second ends, and ii) the solid state light emitter lighting assembly comprises a plurality of light guides and the individual sub-reflectors are arranged to receive light from a corresponding one of the light guides.

9. A solid state light emitter lighting assembly according to claim 1, wherein a cross-sectional shape of the reflector, or a cross-sectional shape of the left part and of the right part of the reflector is substantially circular or parabolic and, optionally, the reflector, is positioned with respect to the second end of the light guide such that the focal point of the reflector is close to the second end, of the light guide to obtain a predefined light beam that is emitted into the surroundings.

10. A solid state light emitter lighting assembly according to claim 9, wherein a cross-sectional shape of a portion of the reflector that reflects impinging light towards the light guide for transmission through the light guide via the side surfaces deviates from the ideal circular or parabolic shape to correct for a deteriorated collimation of a portion of the light of the beam of light as the result of refraction of light rays that are transmitted through the light guide via the side surfaces.

11. A solid state light emitter lighting assembly according to claim 1 wherein the second end of the light guide is adapted to influence the light intensity distribution emitted by the second end towards the reflector to optimize the beam of light that is transmitted into the surroundings, and/or the second end may be wedge shaped in a cross-sectional view, may be flat, may be curved, may comprise facets, may comprise a combination of curved surfaces and facets or a combination of a flat surface and a curved surface.

12. A solid state light emitter lighting assembly according to claim 1 comprising a second reflector, the second reflector being arranged at a position to reflect leakage light, wherein leakage light is light that is emitted by the solid state light emitter and is either not coupled into the first end of the light guide because of surface reflection, light rejection, scattering or because of a light emission direction that is not directly towards the first end of the light guide, and
wherein the second reflector is arranged to reflect leakage light towards the first end of the light guide or towards the light exit window.

13. A solid state light emitter lighting assembly according to claim 1, wherein at least one of: the first end, the second end, and portions of the side surfaces of the light guide comprises structures for mixing light that is guided through the light guide to optimize a light intensity distribution that leaves the light guide at the second end.

14. A solid state light emitter lighting assembly according to claim 1, wherein at least a segment of the light guide is curved and the portion of the light that is reflected by the reflector towards light exit window is transmitted through the segment via the side surfaces, and a cross-sectional thickness of the light guide along the segment varies to compensate for a negative effect of the segment of the light guide on the collimation of the light rays that are transmitted through the segment via the side surfaces.

15. Luminaire comprising the solid state light emitting lighting assembly according to claim 1.

\* \* \* \* \*